United States Patent

[11] 3,570,630

[72] Inventors Herbert Frederick Voigt
Flushing;
Otto Albert Krauer, Tuckahoe; Harvey Ronald Schor, Rockaway Park, N.Y.
[21] Appl. No. 795,841
[22] Filed Feb. 3, 1969
[45] Patented Mar. 16, 1971
[73] Assignee Otis Elevator Company
New York, N.Y.

[54] LANDING SELECTOR APPARATUS
14 Claims, 3 Drawing Figs.
[52] U.S. Cl. ................................................. 187/29, 318/18
[51] Int. Cl. ................................................. B66b 1/52
[50] Field of Search ..................................... 187/29; 318/20.250

[56] References Cited
UNITED STATES PATENTS
3,146,857 9/1964 Bosshard ..................... 187/29
3,422,928 1/1969 Bruns ........................... 187/29

Primary Examiner—Oris L. Rader
Assistant Examiner—W.E. Duncanson, Jr.
Attorneys—Joseph L. Sharon and Robert T. Mayer ABSTRACT: Landing selector apparatus for use in an elevator control system. An output voltage whose magnitude signifies the location of the car in the hoistway is added to a voltage whose magnitude is a function of the distance required to stop the car from the speed at which it is traveling. The magnitude of the sum of these two voltages is compared with the magnitudes of discrete voltages proportional to the locations of the landings to scan the landings to determine that at which the next stop will be made. Upon the receipt of a signal that a stop is required at a landing being scanned that landing is selected and a signal suitable to control the deceleration of the car as a function of its distance from the selected landing is produced in response to the difference between a signal signifying the location of the selected landing and a signal signifying the location of the car. When the car approaches within a predetermined distance of the selected landing equipment which functions in the same way but which measures the distance between the car and the selected landing more accurately than the foregoing is used to control the final approach of the car to a stop.

LANDING SELECTOR APPARATUS

This is an invention in the elevator art. Specifically it involves landing selector apparatus for use in an elevator control system.

That part of an elevator control system which is commonly referred to as its landing selector apparatus performs two primary functions. It scans the landings in advance of the approach of the car to select the one at which the next stop will be made and after selecting a landing it provides control signals to the elevator motor control system to enable it to decelerate the car in accordance with its distance from the selected landing so as to insure that the car stops accurately at the landing.

Many types of landing selectors have been designed and constructed in the past which are capable of adequately performing these functions. Most of them however are heavy, cumbersome essentially complicated mechanical devices. Recently, it has become most desirable to make selectors which not only are both lighter and more compact but also are less complicated mechanically. The problem is that where this has been attempted the apparatus which has resulted either is more expensive to build and install than comparable previous selectors or is not comparable to previous selectors in that it is incapable of performing adequately, especially in high rise installations.

One of the objects of this invention is to provide a light, compact landing selector in which most of the mechanical components have been eliminated and yet which is comparable functionally to previous selectors.

It is another object of this invention to provide a light, compact, mechanically simple landing selector which is comparable functionally to previous selectors and which can be built and installed at a price which is competitive with that of previous selectors.

In carrying out the invention a first car position potentiometer functioning as a first car position signal means has its wiper connected to the car to produce a first car position voltage the magnitude of which signifies the location of the car in the hoistway. A summation circuit adds the magnitude of this voltage to the magnitude of a voltage which is function of the speed of the car. By suitable scaling this produces a voltage which signifies a location in advance of the location of the car at a distance which is substantially no greater than the distance required to stop the car from the speed at which it is traveling. A comparison means in the form of individual landing comparators compares the magnitude of this advance location voltage with the magnitudes of output voltages produced by a landing position voltage generating means in the form of an individual potentiometer for each landing, each of which produces a discrete voltage the magnitude of which distinguishes its associated landing from every other landing in the hoistway. Upon a predetermined relationship existing between the magnitude of the advance location voltage and the magnitude of any discrete landing voltage an output signal is produced indicating that the car is located substantially at stopping distance from the landing associated with that discrete voltage. If a signal which indicates that a stop is required at that landing coexists with the stopping distance signal for that landing a landing selection relay associated with that landing is energized to indicate its selection as the landing at which the next stop will be made. In this way, each of the landings is scanned for selection in advance of the approach of the car. Upon selection, the wiper of the first car position potentiometer is disconnected from the summation circuit and its resistance element is connected in a bridge circuit comprising a comparison means which compares the output voltage of the wiper of the first car position potentiometer with the output voltage produced by a reference signal generating means in the form of a potentiometer individual to the selected landing. This potentiometer has its wiper permanently fixed mechanically and grounded electrically at a resistance which balances that at which the wiper of the first car position potentiometer rests when the car is stopped at the selected landing. The bridge circuit produces a voltage signifying the difference between the location of the car and the location of the selected landing which after the generation of a signal to stop at the selected landing is suitable to control the deceleration of the car in its approach thereto. Upon the approach of the car to within a predetermined distance of the selected landing a switching means switches the control of the deceleration of the car from the foregoing to other equipment which more accurately indicates the distance of the car from the selected landing. This latter equipment includes second car position signal means in the form of the two potentiometers, one or the other of which produces a second car position voltage which is operable to signify the location of the car at any position within the predetermined distance of each of the landings. Additional comparison means in the form of a bridge circuit compares the magnitude of the second car position voltage from a selected one of the two second car position potentiometers with a voltage individual to the selected landing produced by another reference signal generating means. This means also includes an individual potentiometer for each landing. The potentiometer for a particular landing has its wiper permanently fixed mechanically and grounded electrically at a resistance which balances that at which the wiper of the selected potentiometer reset when the car is located at that particular landing. As a result of this comparison, a voltage is produced which is indicative of the distance of the car from the selected landing and which is suitable to decelerate the car to a stop in its final approach to the floor.

Other objects, features and advantages of the invention may be ascertained from the foregoing and from the following description and appended claims when considered in conjunction with the accompanying drawing, in which:

To simplify the disclosure, only those portions of an elevator system necessary for an understanding of the invention have been shown in detail, it being understood that many changes may be made in adapting this invention to commercial installations. Also, as illustrated, the elevator car serves but three landings, however, the invention is suitable for use in any commercial installation having any number of landings.

Numerals in parentheses appended to some of the reference characters for interconnecting lines in the drawing identify those FIGS. on which the continuation of these lines are located.

Prefix numerals 1 and 2 and the prefix T in some of the reference characters signify the association of the equipment identified by those characters with the first, second and top landings, respectively.

Figure 1:
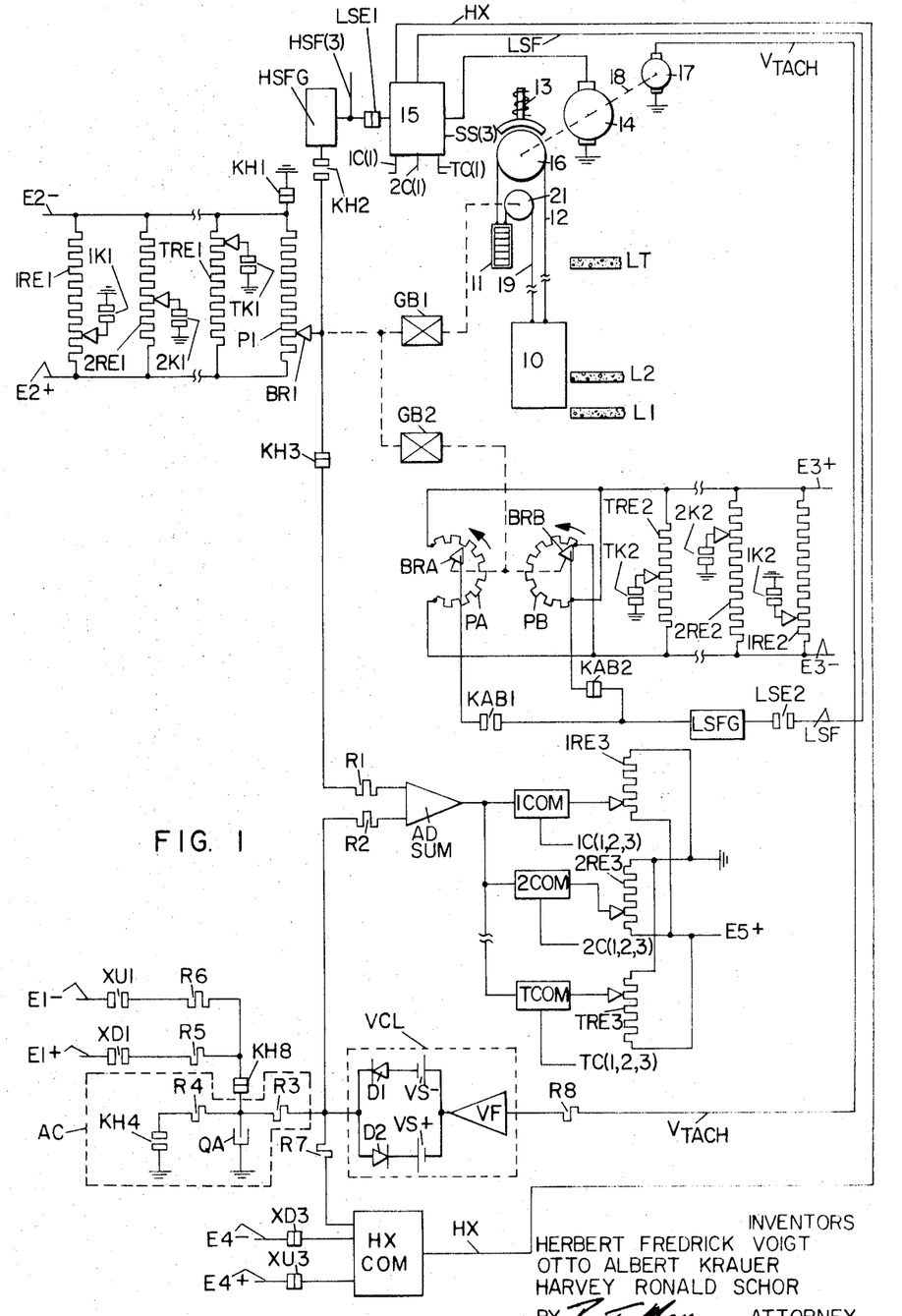
FIG. 1 is a simplified schematic of an elevator control system including the herein disclosed landing selector apparatus.

Referring to FIG. 1 of the drawing, an elevator car 10 and its counterweight 11 in typical fashion are supported by hoist ropes 12. The car moves whenever brake 13 is lifted and motor 14 receives power from motor and operations control equipment 15 to rotate sheave 16. In rotating sheave 16, shaft 18 of motor 14 also drives tachometer generator 17 to provide a voltage on line $V_{TACH}$ proportional to the speed of car 10.

Motor and operations control equipment 15 may be any suitable equipment, either the equipment disclosed in the copending "ELEVATOR CONTROL SYSTEM" application of Otto Albert Krauer et al., Ser. No. 495,585 filed Oct. 13, 1965 now Pat. No. 3,442,352 and assigned to the assignee of the instant application or that disclosed in the copending "SPEED DICTATION APPARATUS FOR ELEVATOR MOTOR CONTROL SYSTEM" application of Sidney Howard Benjamin et al., Ser. No. 795,842 filed concurrently herewith and assigned to the assignee of the instant application being presently preferred.

Connected between car 10 and counterweight 11 is a tape 19 which is driven over a sprocket 21 as car 10 moves between any of the landings L1 to LT. Sprocket 21 drives the input shaft of gear box GB1. The output of this component drives both the input shaft of the gear box GB2 and sliding contact, or wiper, BR1 of multiturn first car position potentiometer P1. Depending upon the conditions of contacts KH1 of the landing hold relay KH and contacts 1K1, 2K1 and TK1 of the floor selection relays 1K, 2K and TK, the resistance element of potentiometer P1 is connected either directly across the potential between line E2+ and ground or in a bridge circuit with the resistance element of one of first reference potentiometers 1RE1, 2RE1 or TRE1 across the potential between lines E2+ and E2−. Sliding contact BR1 is connected either through contacts KH3 of landing hold relay KH and resistor R1 to one of the input circuits of summation amplifier ADSUM or through contacts KH2 of landing hold relay KH to the input circuit of high speed function generator HSFG.

The output circuit from function generator HSFG is connected along line HSF through contacts LSE1 to motor and operations control equipment 15. An additional input circuit to motor and operations control equipment 15 is along line HX from advance distance comparator HXCOM. Of the three input circuits to this comparator, one is through contacts XD3 of auxiliary down direction relay XD (coil not shown) to the potential of line E4−, the second is through contacts XU3 of auxiliary up direction relay XU (coil not shown) to the potential of line E4+ and the third is through resistor R7 to a speed responsive signal means including capacitive advance circuit AC and variable voltage clamping network VCL. Advance circuit AC is connected through contacts XU1 of auxiliary up direction relay XU and resistor R6 to a negative voltage source provided by the potential of line E1− and through contacts XD1 of auxiliary down direction relay XD and resistor R5 to a positive voltage source provided by the potential of line E1+. Depending upon the established direction of travel one or the other of these connections provides a charging circuit for condenser QA. Contacts KH4 of the landing hold relay KH and resistor R4 provide a resetting circuit for condenser QA. The output circuit from this condenser is connected through resistor R3 both to the previously mentioned input circuit to comparator HXCOM through resistor R7 and to the second input circuit of summation amplifier ADSUM through resistor R2. Connected at the junction between resistors R2 and R3 is the output circuit from variable voltage clamping network VCL. This network includes voltage follower amplifier VF, diodes D1 and D2 and positive and negative potential voltage sources illustrated as batteries VS+ and VS−. The input circuit to network VCL is connected from resistor R8 along line $V_{TACH}$ to tachometer generator 17.

The output circuit from summation amplifier ADSUM is connected to individual landing comparators 1COM, 2COM and TCOM. An additional input circuit to each of these comparators is connected from the wiper of its corresponding landing position potentiometer 1RE3, 2RE3 or TRE3. The resistance element of each of these potentiometers is connected across a potential applied between line E5+ and ground. Each of the landing comparators includes a built in time delay and changes the landing scanning output signal along line 1C, 2C or TC, respectively, a predetermined time after the signals applied to its two input circuits attain a predetermined relationship with respect to each other.

The output shaft of gear box GB2 is connected to sliding contacts, or wipers, BRA and BRB of rotary single turn second car position potentiometers PA and PB, respectively. The end terminals of these potentiometers are connected to lines E3+ and E3− so that their resistance elements are connected in a bridge circuit with the resistance elements of second reference potentiometers 1RE2, 2RE2 and TRE2 whose end terminals are also connected to lines E3+ and E3−. Contacts 1K2, 2K2 and TK2 of landing selection switches 1K, 2K and TK connect predetermined points on the resistance elements of potentiometers 1RE2, 2RE2 and TRE2 to ground potential through their individual wipers. Wipers BRA AND BRB are respectively connected through contacts KAB1 and KAB2 to the input circuit of low speed function generator LSFG. The output circuit from this generator is connected through contacts LSE2 along line LSF to another input circuit of motor and operations control equipment 15.

Figure 2:
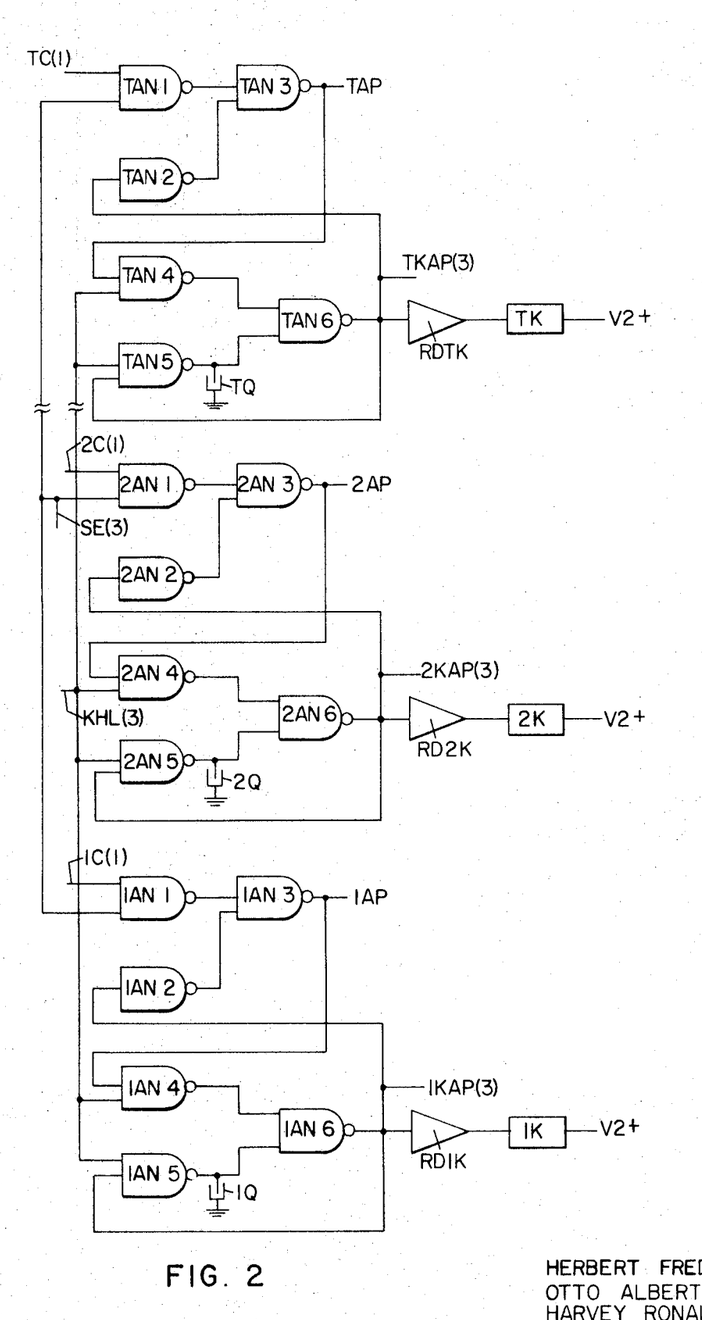
FIG. 2 is a circuit diagram of switching logic circuits used in the herein disclosed landing selector to operate individual landing selection relays.

The coil of each of the landing selection relays 1K, 2K and TK shown in FIG. 2 is connected through an associated relay driver circuit RD1K, RD2K and RDTK to an individual switching logic circuit. Each of these circuits is implemented by six NAND units illustrated as AND units AN1 to AN6 with inverted outputs as conventionally symbolized by the small circles in their output circuit lines.

Figure 3:
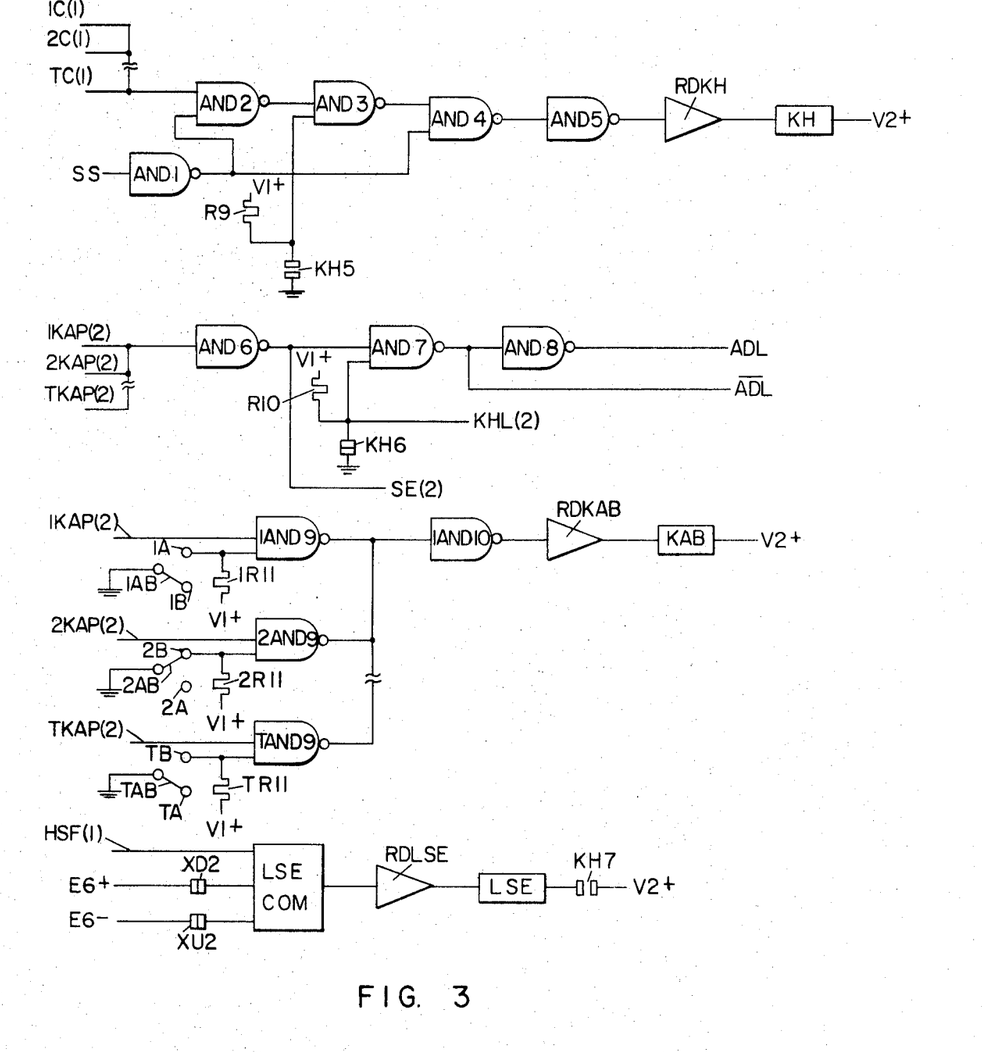
FIG. 3 is a circuit diagram of various switching logic circuits and a comparator circuit.

The switching logic circuits of FIG. 3 are similarly implemented by NAND units illustrated as AND units with inverted outputs. Each of the individual landing units 1AND9, 2AND9 and TAND9 in the coil circuit of second car position potentiometer selection relay KAB has an associated manual single pole double throw switch 1AB, 2AB and TAB in one of its input circuit lines. For reasons which will be more apparent later, each of the movable contacts of these switches is permanently connected to either of its associated fixed contacts A or B. Contact A is selected for a particular landing if when car 10 is stopped at that landing wiper BRA (FIG. 1) is closer to the midpoint of the resistance element of its potentiometer than wiper BRB is to its, and vice versa.

One of the input circuits of low speed enable comparator LSECOM of FIG. 3 is connected to high speed function generator HSFG (FIG. 1) along line HSF. Of the other two inputs circuits, one is connected to the potential of line E6+ through contacts XD2 of auxiliary down direction relay XD and the other to the potential of line E6− through contacts XU2 of auxiliary up direction relay XU. Low speed enable comparator LSECOM produces an output signal to energize the coil of low speed enable switch LSE through relay driver RDLSE whenever the magnitude of the signal along line HSF is less than the magnitude of the potential of either line E6+ or E6− provided in the first case that the up direction of travel is established and in the second that the down direction of travel is established.

Before proceeding to a detailed description of operation it will facilitate matters to understand that first car position potentiometer P1 is a multiturn rotary potentiometer and that the ratio of gear box GB1 is so selected that wiper BR1 makes no more than one full transit from one end terminal of the resistance element of potentiometer P1 to the other in response to the total travel of the car from one end of the hoistway to the other in one direction of travel. In other words, the location of car 10 at each particular position in the hoistway is distinguished from its location at every other position by the resistance value of potentiometer P1 at which wiper BR1 is located. Accordingly, when the resistance element of potentiometer P1 is connected between the potential of line E2+ and ground, the location of the car at each landing is distinguished from its location at every other landing by a different and discrete voltage magnitude appearing at wiper BR1.

Contacts 1K1, 2K1 and TK1 (FIG. 1) of landing selection relays 1K, 2K and TK connect the wipers of their associated first reference potentiometers 1RE1, 2RE1 and TRE1 to ground. The wiper of each of these potentiometers is mechanically fixed in a permanent position at a resistance value which bears the same relationship to the total resistance of its associated resistance element as the height of its corresponding landing bears to the total vertical rise of the hoistway. The resistance value at the wiper of each first reference potentiometer is proportional to that resistance value of potentiometer P1 which distinguishes the individual landing with which each reference potentiometer is associated. The proportionality factor is determined by the relationship between the total resistance of the resistance elements of the first reference potentiometers and the total resistance of the resistance element of potentiometer P1. In this way, whenever car 10 is stopped at a landing the bridge circuit formed by these components is balanced. Similarly, the wipers of landing position potentiometers 1RE3, 2RE3 and TRE3 are also mechanically fixed in permanent positions at resistance values proportional to those of potentiometer P1 which distinguish their respective landings.

In the presently described tested embodiment second car position potentiometers PA and PB are single turn rotary potentiometers whose wipers, BRA and BRB can turn continuously through zero in either direction. The ratios of gear boxes GB1 and GB2 are such that the wiper of each potentiometer makes one complete revolution for each eight feet of car travel in the hoistway. During each revolution each wiper, BRA and BRB, travels progressively from the end terminal corresponding to the zero ohms position on the resistance element of its respective potentiometer to the end terminal corresponding to its maximum resistance value into a deadband region, or unusable portion. The potentiometers are arranged however so that the wipers start their travel through the unusable portions of their respective potentiometers 180° apart. Thus any time either one is traveling through its unusable portion the other is traveling through its usable portion. That potentiometer is selected for use at a particular landing whose wiper is closest to the midpoint of its resistance element, or to put it another way, is farthest from its unusable portion, when the car is stopped at that landing. This insures a sufficient portion of the resistance element of the selected potentiometer on each side of the associated wiper at every landing at which the car stops. The wiper of the second reference potentiometer 1-RE2, 2RE2 or TRE2 associated with a particular landing is mechanically fixed in a permanent position at a resistance value proportional to that at which the wiper of the second car position potentiometer selected for use at that particular landing is located when the car is stopped thereat so as to balance the bridge circuit formed by those components in that situation. Stated otherwise, the wiper of a particular second potentiometer is stationarily located at a resistance value which forms the same ratio with the total resistance of the particular potentiometer as the resistance value at the wiper of the second car position potentiometer selected for use with the particular second reference potentiometer forms with the total resistance of the selected second car position potentiometer when the car is located at the landing associated with the particular second reference potentiometer.

With the foregoing in mind assume car 10 is stopped at landing L1 when it is prepared for future travel in the up direction and receives a signal to start in any suitable manner. For example, in the elevator system of U.S. Pat. No. 3,149,305, issued Sept. 15, 1964 to William Frank Glaser et al., the car is prepared for future travel in the up direction by the operation of auxiliary up direction relay XU in response to the registration of a car or hall call at a landing above the location of the car. A signal to start is generated in that system by the closing of contacts S2 of starting switch S in response to the operation of either auxiliary up direction relay XU or auxiliary down direction relay XD together with the release of loading time relay NT. Assume the operation in the present system is similar and that the closing of contacts S2 (not shown) causes motor and operations control equipment 15 to generate a binary 1 signal along line SS. This causes And circuit AND4 and its associated inverter (FIG. 3) to change their output signal to the binary 1 condition. In response landing hold relay KH releases closing contacts KH1, KH3 and KH8. The closing of these first two contact pairs applies a positive potential with respect to ground, the magnitude of which signifies the location of car 10, through wiper BR1, contacts KH3 and resistor R1 to one input circuit of summation amplifier ADSUM.

In addition, assume the preparation of car 10 for future up travel, as in the forementioned Glaser et al. patent, operates auxiliary up direction relay XU. This closes contacts XU1 (FIG. 1) and opens contacts XU2 (FIG. 3) and XU3 (FIG. 1). The closing of contacts XU1 starts to charge condenser QA through resistor R6 and previously closed contacts KH8 with the negative potential of line E1−. This enables it to apply an increasing negative voltage through resistor R2 and R3 to the other input circuit of summation amplifier ADSUM. The potential of this applied voltage is limited to a predetermined magnitude because diode D1, voltage source VS− and voltage follower amplifier VF of variable voltage clamping network VCL acts as a sink to any potential above that magnitude. The initial level of the sink is high enough, however, to permit the magnitude of the voltage from condenser QA to exceed the magnitude of the potential along line E4− applied to advance distance comparator HXCOM through contacts XD3. When this occurs comparator HXCOM applies a signal along line HX to motor and operations control equipment 15 to cause it to lift brake 13 and to provide a speed control voltage to motor 14 to rotate sheave 16. As the car starts to move tachometer generator 17 applies a voltage proportional to the car speed along line $V_{TACH}$ and through resistor R8 to network VCL which raises the absolute magnitude of the sink formed by the diode D1, source VS− and amplifier VF in accordance with the speed of the car.

In the described tested embodiment advance circuit AC and clamping network VCL have been so constructed that an increasing negative potential voltage the maximum magnitude of which is equivalent to 15 feet in the hoistway is applied to amplifier ADSUM before the car travels any appreciable distance or reaches any appreciable speed. In other words, the initial level of the sink provided by network VCL is high enough to permit condenser QA to charge to a potential the magnitude of which is equivalent to 15 feet in the hoistway without any voltage being applied along line $V_{TACH}$. This is satisfactory to provide sufficiently early indications of advance car locations to enable suitable hall lantern operation on any length of trip.

Except for the 15 foot offset the voltage along line $V_{TACH}$ from tachometer generator 17 otherwise causes network VCL to control the negative potential output voltage from condenser QA so that it is substantially proportional to the actual speed of car 10. By suitable scaling the magnitude of this voltage is made substantially proportional to the distance required to stop the car in a predetermined manner from the speed at which it is traveling. As a result of the algebraic summation it performs, amplifier ADSUM produces a variable output voltage the magnitude of which satisfactorily signifies locations in advance of the location of the car which in accordance with car speed is not substantially greater than stopping distance ahead. This voltage is compared through landing comparators 1COM, 2COM and TCOM to the output voltages from the wipers of landing position potentiometers 1RE3, 2RE3, and TRE3 and in this way each of the landings is scanned when the car is located at position which is substantially no farther away in the direction of travel than stopping distance for the speed at which the car is traveling.

Initially the increasing magnitude of the negative potential voltage from condenser QA causes the magnitude of the output voltage from amplifier ADSUM to decrease to within a predetermined amount of the magnitude of the voltage applied to second landing comparator 2COM from the wiper of the landing position potentiometer for the second landing 2RE3. As a result after the inherent time delay of comparator 2COM a landing scanning signal in the form of a binary 1 signal signifying the advance location of the car at the second landing appears along line 2C. If at this time a stop were required at the second landing the binary 1 signal along line 2C would cooperate with a signal signifying the requirement of the stop to cause motor and operations control equipment 15 to produce a signal signifying that the second landing is to be selected as the one at which the next stop will be made. Assume however that no such requirement exists and that the car continues to travel up the hoistway. This causes its speed to increase until it reaches full rated running speed at which time the output signal from tachometer generator 17 along line $V_{TACH}$ enables advance circuit AC to produce an output voltage equivalent to the full speed stopping distance. The selector is now scanning landings at full speed stopping distance in advance of the location of the car.

Assume the car reaches a location such that the magnitude of the scanning output voltage from amplifier ADSUM decreases to within a predetermined magnitude of the voltage applied to top landing comparator TCOM from the wiper of landing position potentiometer TRE3. This produces a binary 1 signal along line TC after the expiration of the time delay of comparator TCOM. Assume also that a signal signifying that a stop is required at the top landing has been generated in motor and operations control equipment 15. Such a signal would be generated as the result of the existence of a top landing hall or a car call. The coincidence of the existence of such a call and the existence of the landing scanning signal in the form of a binary 1 signal along line TC signifies that the top landing is to be selected as the one at which the next stop will be made. As a result, motor and operations control equipment 15 operates starting switch S to its released condition similar to the manner in which it is so operated in the foremention Glaser et al. patent, opening contacts S2 (not shown) and causing the signal along line SS (FIG. 3) to change to the binary 0 value. The output signal from And circuit AND4 and its inverter thereupon changes to the binary 1 value causing the energization of the coil of landing hold relay KH through relay driver RDKH. This opens contacts KH1, KH3 and KH6 and closes contacts KH2.

The opening of contacts KH1 and KH3 (FIG. 1) interrupts the application of the output of wiper BR1 of potentiometer P1 to summation amplifier ADSUM. Notwithstanding the consequent interruption of one of the inputs to comparator TCOM, the binary 1 signal along line TC is maintained until the expiration of the time delay of the comparator. The opening of contacts KH6 (FIG. 3) causes the application of a binary 1 signal along line KHL (FIG. 3). At the same time binary 1 signals are applied along lines SE and TC to top landing and circuit TAN1 (FIG. 2). As a result a binary 1 signal is applied along line TAP to top landing AND circuit TAN4. This signal together with binary 1 signal applied to circuit TAN4 along line KHL causes it and its inverter to produce a binary 0 signal. As a result the signal along line TKAP changes to the binary 1 value and top landing selection switch TK is energized through And circuit TAN6 and relay driver RDTK to select the top landing as the one at which the next stop will be made. The operation of relay TK closes contacts TK1 to connect the resistance element of potentiometer P1 in a bridge circuit across the potential between lines E2+ and E2− with the resistance element of top landing first reference potentiometer TRE1.

Ground potential at the wiper of potentiometer TRE1 signifies the location of the top landing while the voltage at wiper BR1 of potentiometer P1 in relation to this signifies the location of the car. As a result, the output voltage from wiper BR1 is proportional to the distance between the location of car 10 and that of the top landing. This is applied through contacts KH2 to high speed function generator HSFG to produce a signal which is applied to motor and operations control equipment 15 through contacts LSE1. In response, upon the generation of a signal to stop, equipment 15 decelerates the car as a function of its distance from the top landing.

The output from high speed function generator HSFG is also applied along line HSF to low speed enable comparator LSECOM. When this signal decreases below the magnitude of the potential applied along line E6+ to signify the location of car 10 within a predetermined distance of the top landing, low speed enable relay LSE operates through contacts KH7 and relay driver RDLSE. This opens contacts LSE1 and closes contacts LSE2 to disconnect the high speed function generator from motor and operations control equipment 15 and connect low speed function generator LSFG thereto.

In the meantime the binary 1 signal along line TKAP and that from line V1+ through resistor TR11 causes top landing and circuit TAND9 and its inverter to produce a binary 0 signal. This energizes relay KAB through relay driver KDKAB. Thus contacts KAB1 are closed connecting the resistance element of second car position potentiometer PA in a bridge circuit across the potential between lines E3+ and E3− with the resistance element of top landing second reference potentiometer TRE2.

In the described tested embodiment, the bridge circuit formed by second car position potentiometer PA and PB and the second reference potentiometers 1RE2, 2RE2 and TRE2 becomes operative within approximately two feet on either side of a selected landing at which a stop is being made. Within this predetermined distance the ground potential at the wiper of the second reference potentiometer associated with the selected landing signifies the location of the landing while the voltage and the wiper of the selected second car position potentiometer in relation to ground potential signifies the location of the car. Accordingly, with the top landing selected the bridge circuit formed by potentiometer PA and second reference potentiometers TRE2 provides an output voltage from wiper BRA which is a function of the distance between the car and the top landing at any car location within approximately two feet of that landing. This applied through contacts KAB1 to low speed function generator LSFG which provides a signal through contacts LSE2 along line LSF to motor and operations control equipment 15 to control the final approach of the car to a satisfactory stop within suitable accuracy of the top landing.

From the foregoing it is apparent that the present invention provides landing selector apparatus for use in an elevator control system which not only scans landings in advance of the approach of the car to select the one at which the next stop will be made but also provides control signals to the elevator motor control system to enable it to decelerate the car in accordance with its distance from the selected landing so as to insure that the car stops accurately at that landing.

Moreover, the apparatus is mechanically simple. Upon being adjusted to suit the peculiarities in landing heights of any installation the apparatus operates with the wipers of all but three of its potentiometers located in stationary positions. Thus in operation the mechanical parts that are movable include, in addition to suitable bearings, only a drive sprocket rotated by a tape connected between the car and its counterweight, two geared speed reduction units and three potentiometers.

It is to be noted also that secondary functions that it is desirable to have a selector perform are also capable of being performed by the apparatus of this invention. For example, satisfactory advance hall lantern and car position indications are available if the output signals along lines 1C, 2C and TC from landing comparators 1COM and TCOM are employed in conjunction with landing selection switches 1K, 2K and TK to control these functions. Discrete distance signals indicative of the distance between the car and a selected landing are available through the use of comparators similar to low speed enable comparator LSECOM. Signals indicative of scanned positions in advance of the location of the car are also available. These can readily be generated through the use of comparators similar to advance distance comparator HXCOM. The output signals along line ADL and $\overline{ADL}$ of FIG. 3 are other signals desirably generated by a selector machine. The former indicates that a landing has been selected and that the logic circuits have operated to maintain such an indication. The latter is in inverse of the former.

Other functions which the disclosed apparatus is capable of performing will be apparent to those skilled in the elevator art. Various modifications of this apparatus are also possible, and it is intended that the foregoing be considered illustrative and not exclusive or in any sense limiting.

We claim:

1. Landing selector apparatus for use in an elevator system for providing control over the movement of an elevator car in response to signals to start and to stop at selected ones of a plurality of landings in its hoistway, said apparatus including, first reference signal generating means responsive to the selection of a particular one of said landings generating a first reference signal signifying the location of said landing, first car position signal means responsive to the selection of said particular landing and to the movement of said car producing a first car position signal, first comparison means responsive to the selection of said particular landing receiving and comparing said first reference signal and said first car position signal and in response thereto generating a first output signal signifying the distance between the location of said car and the location of said selected landing and suitable after the generation of a signal to stop thereat to control a portion of the deceleration of said car in its approach thereto; second reference signal generating means responsive to the deceleration of said car to within a predetermined distance of said selected landing generating a second reference signal signifying the location of said selected landing; second car position signal means responsive to the approach of said car to within said predetermined distance of said selected landing and to the movement of said car generating a second car position signal; second comparison means responsive to the approach of said car to within said predetermined distance of said selected landing receiving and comparing said second reference signal and said second car position signal and in response thereto generating a second output signal signifying the distance between the location of said car and the location of said selected landing and suitable within said predetermined distance thereof to control the final approach of said car to a stop thereat; and switching means responsive to approach of said car to within said predetermined distances of said selected landing switching the control of the approach of said car from said first output signal to said second output signal.

2. Landing selector apparatus according to claim 1, wherein said second car position signal means includes a first potentiometer having a wiper which is connected to the elevator car and is rotated by the movement of said car through the full range of the usable resistance portion of its potentiometer progressively from its zero ohms position to its maximum resistance value and through its usable portion to its zero ohms position again for each predetermined portion less than the total possible vertical movement of the car in said hoistway.

3. Landing selector apparatus according to claim 2, wherein said second car position signal means includes a second potentiometer having a wiper which also is connected to the elevator car and is rotated by the movement of said car through the full range of the usable resistance portion of its potentiometer progressively from its zero ohms position to its maximum resistance value and through its unusable portion to its zero ohms position again for each predetermined portion less than the total possible vertical movement of the car in said hoistway, said first and said second potentiometers being so selected and their wipers being so connected to said car that throughout the total possible vertical movement of said car whenever the wiper of one potentiometer is passing through the unusable portion of its potentiometer the wiper of the other potentiometer is passing through the usable portion of its potentiometer.

4. Landing selector apparatus according to claim 3, wherein said second reference signal generating means includes a plurality of resistance elements, a different one for each of said landings and each having an output connection, the output connection on a particular resistance element being located at a resistance value which forms the same ratio with the total resistance of said particular element as the resistance value at the wiper of one of said potentiometers forms with the total resistance of said potentiometer when the car is located at the landing associated with said particular resistance element.

5. Landing selector apparatus according to claim 4, wherein said first car position signal means is operable prior to the selection of a landing to produce a voltage which distinguishes each location of the car from every other location by a different and discrete magnitude.

6. Landing selector apparatus according to claim 5, including speed responsive signal means operating in response both to a signal to start and to the actual speed of said car and producing a speed responsive voltage the magnitude of which signifies at least the minimum distance required to stop said car in a prescribed manner from the speed at which it is moving; summation means operable prior to the selection of a landing receiving and algebraically summing the voltage produced by said first car position signal means and said speed responsive voltage and producing a variable advance location voltage the magnitude of which in relation to a particular reference signifies locations in advance of the location of said car; landing position voltage generating means generating for each landing to a landing position voltage the magnitude of each of which in relation to said particular reference distinguishes its associated landing from any other in said hoistway; landing comparator means receiving and comparing said variable advance location voltage and said landing position voltages and producing an individual landing scanning signal whenever a predetermined relationship exists between said varying advance location voltage and the landing position voltage corresponding to any landing; and landing selection switching means operating in response to the simultaneous existence of both a signal signifying a requirement to stop at a particular landing and the landing scanning signal for that particular landing.

7. Landing selector apparatus according to claim 6, wherein said speed responsive signal means includes a capacitive circuit and a negative and a positive voltage source connected thereto, said capacitive circuit operating in response to a signal to start and producing said speed responsive voltage by being charged from either said negative or said positive voltage source, depending upon the direction of car movement which is established.

8. Landing selector apparatus according to claim 7, wherein said speed responsive signal means includes both a variable voltage clamp connected to said capacitive circuit which limits the magnitude of said speed responsive voltage which can be received by said summation means and a tachometer generator responsive to the movement of said car producing an output voltage signifying the actual speed of said car which is applied to said variable voltage clamp and varies the limit of the magnitude of the speed responsive voltage which can be received by said summation means.

9. Landing selector apparatus according to claim 8, wherein said first reference signal generating means includes an individual first reference potentiometer for each landing, the resistance element of each of which is connected across a predetermined potential between two supply lines and the wiper of each of which in response to the selection of its associated landing is connected to ground at a resistance value which bears the same relationship to the total resistance of its associated resistance element as the height of its corresponding landing to the total vertical rise of the hoistway.

10. Landing selector apparatus according to claim 9, wherein said first car position signal means includes a potentiometer whose wiper is connected to said car and is rotated thereby no more than from one terminal of the resistance element of said potentiometer to the other as the car moves through its total possible vertical movement in the hoistway, each of the two terminals of said potentiometer being connected to a different one of said supply lines, the one line itself being connected to ground potential in response to a signal to start, said ground connection being removed and said car position potentiometer and a first reference potentiometer being connected to said first comparison means in response to the selection of the landing associated with said first reference potentiometer, said first comparison means comprising a bridge circuit of said car position potentiometer and said individual first reference potentiometer.

11. In an elevator system for building hoistway having a plurality of landings including a lower and an upper terminal landing, an elevator car serving said plurality of landings in response to signals to start from and to stop at selected ones of said landings, a hoisting motor moving said car up and down between said lower and upper terminal landings to serve said plurality of landings, a rotary car position potentiometer having a wiper and a resistance element with two end terminals, said wiper being connected to said car and rotated by the movement thereof through its path of movement over the resistance element of said potentiometer in one of its rotary directions from one end terminal to the other more than once for each movement of said car from one terminal landing to the other in one of its directions of movement, resistance means having two end terminals, an electrical connection on said resistance means at a resistance value which bears the same relationship to one of its end terminals as the resistance value at said wiper bears to one of the end terminals of said potentiometer when the car is located at a particular one of said landings, and comparison means operable to compare the resistance value at the electrical connection on said resistance means with the resistance value at the wiper of said potentiometer, said comparison means being operable in response to a signal to stop at said particular landing and to the approach of said car to within a predetermined distance thereof to produce thereafter throughout the stopping operation of said car a distance controlled signal the magnitude of which is a function of the distance between said car and said particular landing.

12. In an elevator system according to claim 11, including a second rotary car position potentiometer having a wiper and a resistance element with two end terminals, said wiper also being connected to said car and rotated by the movement thereof through its path of movement over the resistance element of its potentiometer in one of its rotary directions from one end terminal to the other more than once for each movement of said car from one terminal landing to the other in one of its directions of movement, and wherein said resistance means includes a plurality of reference potentiometers, each having a resistance element with two end terminals, and each particular reference potentiometer having a wiper providing an electrical connection at a resistance value of its resistance element which bears the same relationship to one of its end terminals as the resistance value at the wiper on a selected one of said car position potentiometers bears to one of its end terminals when the car is located at a different one of said landings, whereby each reference potentiometer is individually associated with a different one of said landings.

13. In an elevator system according to claim 12, wherein each of said car position rotary potentiometer is a single turn one and for each movement of the car between adjacent landings the wiper on each potentiometer is rotated through the full range of the usable resistance portion of its potentiometer progressively from its end terminal corresponding to its zero ohms position to its end terminal corresponding to its maximum resistance value and through its unusable portion to its zero ohms position again, said potentiometers being so selected and their wipers being so connected to said car that throughout a movement of the car from one terminal landing to the other whenever one wiper is passing through the unusable portion of its potentiometer the other wiper is passing through the usable portion of its potentiometer.

14. In an elevator system according to claim 13, wherein said comparison means includes a voltage source, circuit means connecting the end terminals of said car position potentiometers and said reference potentiometers in a bridge circuit across said voltage source, landing selection means connecting the wiper on the reference potentiometer associated with a particular landing to ground in response to the selection of said particular landing as the one at which the next stop will be made, and car position potentiometer selection means operable, after said ground connection is made and when said car approaches to within said predetermined distance of said selected landing, to select the wiper of one of said car position potentiometers as the output of said bridge circuit from which said distance controlled signal is produced.

UNITED STATES PATENT OFFICE
CERTIFICATE OF CORRECTION

Patent No. 3,570,630  Dated March 16, 1971

Inventor(s) Herbert Frederick Voigt, Otto Albert Krauer and Harvey Ronald Schor

It is certified that error appears in the above-identified patent and that said Letters Patent are hereby corrected as shown below:

Column 9, line 30, "distances" should read -- distance --
Column 9, line 39, "usable" should read -- unusable --.
Column 9, line 75, "discrete magnitude" should read -- disc potential magnitude --. Column 10, line 14, "landing to a landing" should read -- landing a landing --. Column 10, line 73, "for building" should read -- for a building --.

Under References Cited, UNITED STATES PATENTS, "3,422,9 1/1969, Bruns, 187/29" should read -- 2,699,226, 1/1955, Br 187/29 --.

Signed and sealed this 10th day of August 1971

(SEAL)
Attest:

EDWARD M. FLETCHER, JR.
Attesting Officer

WILLIAM E. SCHUYLER, JR.
Commissioner of Patents